2,934,501

FIRE-RESISTANT FUNCTIONAL FLUID AND LUBRICANT COMPOSITION

Douglas H. Moreton, Pacific Palisades, Calif., assignor to Douglas Aircraft Company, Inc., Santa Monica, Calif.

No Drawing. Original application October 20, 1952, Serial No. 315,836. Divided and this application September 21, 1956, Serial No. 611,380

9 Claims. (Cl. 252—78)

This invention relates to a new composition of matter useful as a functional fluid, such as a hydraulic fluid and lubricant, especially such a fluid having a high degree of non-flammability.

Certain functional fluids for hydraulic systems are required to meet many stringent specification requirements relating to such properties as viscosity at low and high temperatures, rate of change of viscosity with temperature, pour point, volatility, density, stability, ability to lubricate, etc., and in addition are required to have a high degree of non-flammability. The compositions of my invention have properties making them surprisingly suitable for such functional fluids.

Compositions of my invention are made by compounding at least three essential ingredients; namely, a major proportion of a suitable ester of an acid of phosphorus, a smaller proportion of a suitable halogenated hydrocarbon, and a suitable agent to increase the viscosity index and viscosity at elevated temperatures.

It is an especially significant discovery in accordance with my invention that the halogenated compound not only increases the fire resistance but also the extreme pressure properties of the phosphate or phosphonate. This is especially surprising because these properties are outstandingly high for these esters alone. Moreover, this can be done without loss of the desirable properties of either component.

The esters of an acid of phosphorus particularly include the phosphates, and the phosphonates having three organic radicals which may be the aryl radicals phenyl, cresyl or xylyl; alkyl radicals having from 4 to 10 carbon atoms, or alkoxyalkyl having from 3 to 6 carbon atoms. These phosphorus compounds may be represented by the following formulas:

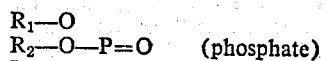   (phosphate)

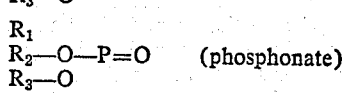   (phosphonate)

where $R_1$, $R_2$ and $R_3$ may be the aryl radicals phenyl, cresyl or xylyl, alkyl radicals having from about 4 to 10 carbon atoms, or alkoxyalkyl having from about 3 to 6 carbon atoms. These esters may be represented by the more general formula

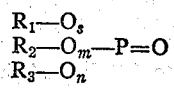

where $s$, $m$ and $n$, may each be 0 or 1, but only one may be 0.

In these esters, where $R_1$ is phenyl, cresyl or xylyl, and $R_2$ is phenyl, cresyl or xylyl, it is preferred, where $R_3$ is an alkyl group, that it have from 4 to 10 carbon atoms, and more preferably that it be a branched chain or isomeric alkyl group.

By way of exemplification, such phosphates suitable for the purpose of my invention include tricresyl phosphate, trixylyl phosphate, cresyl diphenyl phosphate, xylyl diphenyl phosphate, triphenyl phosphate, tributyl phosphate, trioctyl phosphate, trihexyl phosphate, trinonyl phosphate, hexyl dicresyl phosphate, octyl diphenyl phosphate, nonyl diphenyl phosphate, decyl diphenyl phosphate, octyl dicresyl phosphate, nonyl dicresyl phosphate, octyl phenyl cresyl phosphate, nonyl phenyl cresyl phosphate, octyl phenyl xylyl phosphate, nonyl phenyl xylyl phosphate, octyl cresyl xylyl phosphate, nonyl cresyl xylyl phosphate, octyl dixylyl phosphate and nonyl dixylyl phosphate, di(2-ethyl hexyl) phenyl phosphate, di(n-butyl) phenyl phosphate, 2-ethyl hexyl butyl phenyl phosphate, preferably where the alkyl groups, hexyl, octyl, nonyl and decyl are the branched chain or isomeric alkyl groups, isomeric hexyl, isomeric octyl, isomeric nonyl and isomeric decyl, for example, the isomeric octyl may be 2-ethyl hexyl, and more preferably where the isomeric alkyl group has at least two branches, for example, the isomeric nonyl may be a trimethylhexyl such as $Me_3C.CH_2(CH.CH_3)CH_2.CH_2$—butoxyethyl phosphate, and methoxyethyl phosphate. Moreover, the corresponding phosphonates may also be used. The phosphonates are the corresponding esters of phosphonic acid. The phosphonates particularly include di-octyl phenyl, di(n-amyl) phenyl, and di(n-butyl) phenyl phosphonates. As used herein, "crescyl" indicates the tolyl or methylphenyl radical and "xylyl" the dimethyl phenyl radical.

The halogenated hydrocarbons suitable for the compositions of the present invention are the substantially completely halogenated hydrocarbon compounds normally liquid at temperatures within the range of about $-20$ to $200°$ C., including the chlorinated, fluorinated, brominated and iodinated hydrocarbon compounds, particularly the fully halogenated lower hydrocarbons, saturated or unsaturated, in which most or all of the hydrogen atoms have been replaced by halogen atoms, which may be all the same or different.

The halogenated aliphatic hydrocarbons which are particularly suitable for the purposes of my invention include the stable halogenated aliphatic hydrocarbons having from 3 to 5 carbon atoms with at least as many halogen atoms as hydrogen atoms, preferably with at least twice the number of halogen atoms as hydrogen atoms to the molecule, and for best results with all hydrogen atoms replaced by halogen atoms. The halogenated aliphatic hydrocarbons may be of straight or branched chain structure and may be saturated or unsaturated, although the unsaturated are preferred. In selecting a particular halogenated compound for any particular use, due regard should of course be given to its effect on the resulting composition of such properties as volatility, pour point and viscosity.

These halogenated aliphatic hydrocarbons suitable for the purpose of my invention particularly include hexachloropropylene, hexafluoropropylene, hexabromopropylene, hexachlorobutadiene and hexafluorobutadiene. The butadiene is preferably the 1,3-butadiene, but may also be 1,2-butadiene. Instead of the propylene, any of the corresponding butylenes may be used, particularly including octachloro- or octafluoro-isobutylene, 1-butene and 2-butene(cis- and trans-). Likewise, the similar five carbon atom compounds may be used. Of the halogens, chlorine and fluorine are preferred. Moreover, any number of the halogens may be present in the same compound.

In accordance with the invention a sufficient proportion of the particular halogenated hydrocarbon will be used to increase the non-flammability or fire-resistance of the ester and to improve the extreme pressure properties of the ester as will be required without any substantial impairment of the other desirable properties of the ester for the use intended. It is preferred, however, that the composition contain from about 50 to 85 percent of the ester and from about 50 to 15 percent of the halogenated hydrocarbon, and for the best results for a hydraulic fluid suitable for aircraft from about 20 to 40 percent of the halogenated hydrocarbon and from about 60 to 80 percent of the ester.

My invention will be illustrated by the following examples:

Example 1

A composition was made up by mixing the following at room temperature:

70% by volume tricresyl phosphate
30% by volume hexachloropropylene

These components dissolved readily at room temperature. The non-flammability of the resulting composition was excellent and was substantially improved with respect to the non-flammability of the tricresyl phosphate alone. At —40° F. it was still a liquid, although somewhat viscous. It was useful as a hydraulic functional fluid having a high degree of non-flammability. It had good lubricating properties and its volatility was relatively low. The extreme pressure properties were improved over the phosphate alone.

Example 2

70% by volume isomeric nonyl diphenyl phosphate
30% by volume hexachloropropylene These components dissolved readily at room temperature. The non-flammability of the resulting composition was excellent and was substantially improved with respect to the non-flammability of the phosphate ester alone. At —40° F. it was still a liquid, and relatively non-viscous, that is, of relatively low viscosity. It was useful as a hydraulic functional fluid having a high degree of non-flammability. It had good lubricating properties and its volatility was relatively low. The extreme pressure properties were improved over the phosphate alone.

Example 3

70% by volume tri(2-ethyl hexyl) phosphate
30% by volume hexachloropropylene

These components dissolved readily at room temperature. The non-flammability of the resulting compositions was good and was substantially improved with respect to the non-flammability of the tri(2-ethyl hexyl) phosphate. The tri(2-ethyl hexyl) phosphate has a much lower degree of non-flammability than the phosphate esters used in Examples 1 and 2 and in the light of this fact the improvement attributable to the hexachloropropylene was surprising. At —40° F. this composition was a liquid of surprisingly low viscosity. It was useful as a hydraulic functional fluid having a high degree of non-flammability. It had good lubricating properties and its volatility was relatively low. The extreme pressure properties were improved over the phosphate alone.

In the examples above the hexachloropropylene was an unsaturated compound having 3 carbon atoms, 6 chlorine atoms, 1 double bond between carbon atoms, and no hydrogen. It may be represented by the following formula:

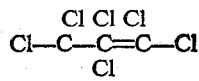

In Example 2 above the isomeric nonyl diphenyl phosphate had two branches in the nonyl radical, and the nonyl radical had the probable formula

Example 4

70% by volume tricresyl phosphate
30% by volume hexachlorobutadiene

Example 5

70% by volume isomeric nonyl diphenyl phosphate
30% by volume hexachlorobutadiene

Example 6

70% by volume tri(2-ethyl hexyl) phosphate
30% by volume hexachlorobutadiene

Example 7

70% by volume di-octyl phenyl phosphonate
30% by volume hexachloropropylene

Example 8

70% by volume di-octyl phenyl phosphonate
30% by volume hexachlorobutadiene

Example 9

70% by volume di(n-amyl) phenyl phosphonate
30% by volume hexachloropropylene

Example 10

70% by volume di(n-amyl) phenyl phosphonate
30% by volume hexachlorobutadiene

Example 11

70% by volume di(n-butyl) phenyl phosphonate
30% by volume hexachloropropylene

Example 12

70% by volume di(n-butyl) phenyl phosphonate
30% by volume hexachlorobutadiene

It is a further discovery in accordance with my invention that it is possible to increase the viscosity index and the viscosity at elevated temperatures of the foregoing mixtures of esters and halogenated hydrocarbons and that this may be done without impairment of the desirable properties of the mixtures. For this purpose there may be used certain polymerized olefins and polymerized unsaturated esters. Such polymerized olefins include polyisobutylene, polystyrene, polyindene, polymerized 1,3-butadiene and polyisoprene. The polymerized unsaturated esters include those in which the unsaturated groups are present in the alcohols or the acid portion of the ester or both.

Certain poly alkyl methacrylates are especially suitable for the purpose of this invention. The polyalkyl methacrylates suitable for the purpose of this invention are in general those resulting from the polymerization of alkyl methacrylates in which the alkyl groups may have from about 4 to 12 carbon atoms. The alkyl groups may be mixtures such as derived from a mixture of alcohols, and in which case there may be included some alkyl groups having as low as 2 carbon atoms and as high as about 18 carbon atoms. The number of carbon atoms in the alkyl group should be such that the polymer is compatible with the particular phosphate used. Usually it will be found that the lower the alkyl group of the phosphate the lower should be the alkyl group of the methacrylate. Usually, it will be satisfactory for the alkyl group of the methacrylate monomer to be from 8 to 10 carbon atoms. The alkyl group is preferably a normal alkyl group, but is satisfactory to some extent if a branch chain. The molecular size of the polymerized methacrylate should be great enough to increase the viscosity of the mixture to which added and small enough to be compatible therewith. In general, the average molecular weight will be within about 2,000 to 12,000 and the range from about 1,500 to 14,000. This polymer should be such and in sufficient proportion to increase the viscosity at elevated temperatures such as 210° F., for example, and to increase the viscosity index, preferably to at least about 100, and more preferably to above about 150.

In compounding the compositions in accordance with this invention, this polymer may be added to the mixture or the monomer may be polymerized in situ with the esters or the halogenated hydrocarbon by adding the unpolymerized alkyl methacrylate ester thereto and then polymerizing to the desired degree.

Suitable poly octyl methacrylates for the purpose of this invention are made and sold by and are available from the Rohm and Haas Company, Philadelphia, Pennsylvania, under its trade mark Acryloid and particularly designated, for example, as Acryloid HF–845, Acryloid HF–855, Acryloid HF–860. In these designations the last two numerals, that is, "45," "55," and "60," denote the viscosity in centistokes at 100° F. of a 30 weight percent solution in toluene of the poly octyl methacrylate in the commercial product.

For the purposes of this invention, it has been discovered that the proportion of poly alkyl methacrylate used may be that which is sufficient to increase the viscosity index of the resulting composition to the desired level for its intended use. Usually from 0.2 to 10 percent by volume of the poly alkyl methacrylate (exclusive of any solvent) will be found satisfactory, and preferably a proportion within the range from 1 to 5 percent. This percentage of polymeric alkyl methacrylate is based on the sum of the polymer, ester, and halogenated hydrocarbon as being 100 percent.

The following examples will further illustrate my invention:

Example 13

65% by volume isomeric nonyl diphenyl phosphate
30% by volume hexachloropropylene
5% by volume Acryloid HF–855

Example 14

65% by volume isomeric nonyl diphenyl phosphate
30% by volume hexachlorobutadiene
5% by volume Acryloid HF–855

Example 15

65% by volume tri(2-ethyl hexyl) phosphate
30% by volume hexachloropropylene
5% by volume Acryloid HF–855

Example 16

65% by volume tri(2-ethyl hexyl) phosphate
30% by volume hexachlorobutadiene
5% by volume Acryloid HF–855

Example 17

65% by volume tricresyl phosphate
30% by volume hexachloropropylene
5% by volume Acryloid HF–855

Example 18

65% by volume tricresyl phosphate
30% by volume hexachlorobutadiene
5% by volume Acryloid HF–855

Example 19

65% by volume di-octyl phenyl phosphonate
30% by volume hexachloropropylene
5% by volume Acryloid HF–855

Example 20

65% by volume di-octyl phenyl phosphonate
30% by volume hexachlorobutadiene
5% by volume Acryloid HF–855

Example 21

65% by volume di(n-amyl) phenyl phosphonate
30% by volume hexachloropropylene
5% by volume Acryloid HF–855

Example 22

65% by volume di(n-amyl) phenyl phosphonate
30% by volume hexachlorobutadiene
5% by volume Acryloid HF–855

Example 23

65% by volume di(n-butyl) phenyl phosphonate
30% by volume hexachloropropylene
5% by volume Acryloid HF–855

Example 24

65% by volume di(n-butyl) phenyl phosphonate
30% by volume hexachlorobutadiene
5% by volume Acryloid HF–855

In the foregoing examples, the three components dissolved at room temperature. However, the triaryl phosphate, tricresyl phosphate, was found to be incompatible with the polymeric octyl methacrylate in the absence of the halogenated hydrocarbons, hexachloropropylene or hexachlorobutadiene, and it is a significant feature of my invention that such chlorinated hydrocarbons render the polymerized octyl methacrylate soluble in such a triaryl phosphate as tricresyl phosphate. The non-flammability of the resulting compositions was surprisingly high, especially in view of the fact that such ether properties as viscosity at low and high temperatures, rate of change of viscosity with temperature, pour point, volatility, density, stability, ability to lubricate, etc. were such as to render these compositions useful as hydraulic functional fluids having a high degree of non-flammability.

As pointed out above, the relative proportions of phosphonate and halogenated hydrocarbon are from about 15 to 50 percent of the phosphonate. Based on hexachlorobutadiene and di-octyl phenyl phosphonate, this corresponds to a chlorine content of from about 15 percent by weight to 70 percent in the two components.

The Acryloid HF–855 used in the foregoing examples was a polymerized octyl methacrylate having an average molecular weight of about 8,500 and a range of molecular weight of about 7,000 to 20,000 dissolved in 45 percent by volume of a light petroleum oil of 200° F. flash point. Thus this Acryloid HF–855 contained 55 volume percent of the polymer and 45 percent of the petroleum oil solvent. The polymer could, of course, be used without the petroleum oil solvent, but the solvent makes the polymer easier to handle and appears to make the polymer dissolve more rapidly. Moreover, suitable polymerized alkyl methacrylates may be produced in a suitable phosphate and used as a mixture of polymer and phosphate, for example, a mixture of 50 percent such polymer and 50 percent 2-ethyl hexyl diphenyl phosphate. In the foregoing examples, since only a small proportion (5%) of the commercial Acryloid HF–855 was used, the proportion of the light petroleum oil solvent was not large enough to impart any undesirable properties to the final liquid product.

Still other high molecular weight organic polymers with molecular weight greater than about 1500 compatible with and soluble in the mixture and being more soluble at 210° F. than at 32° F., and effective to increase the viscosity at 210° F. and the viscosity index may be used.

For some purposes, it will be found desirable to add a stabilizer to the compositions of my invention, such as phenyl cyclohexyl ether or phenyl glycidyl ether. From about 0.1 to 5 percent of such stabilizer will usually be found satisfactory.

It will be understood that the specific examples given above are for the purpose of illustrating the invention and the invention includes other modifications within the scope of the following claims.

This is a division of my co-pending application Serial No. 315,836, filed October 20, 1952, now abandoned, as a continuation-in-part of my applications Serial Number 28,270, filed May 20, 1948, now abandoned, and Serial Number 28,521, filed May 21, 1948, now abandoned.

I claim:

1. The composition consisting essentially of a major proportion of phosphonate having three organic radicals of the group consisting of phenyl, cresyl, xylyl, alkyl with from 4 to 10 carbon atoms, and alkoxy alkyl with from 3 to 6 carbon atoms and a sufficient proportion within the range of about 15 to 50 percent of normally liquid halogenated hydrocarbon liquid at temperatures within the range of about −20° C. to 200° C. effective to increase the fire-resistance and extreme pressure properties of the ester.

2. A fire-resistant functional fluid and lubricant consisting essentially of a major proportion di-octyl phenyl phosphonate and a smaller but sufficient proportion within the range of about 15 to 50 percent of hexachloropropylene to increase the fire resistance and extreme pressure properties of the phosphonate.

3. A fire-resistant functional fluid and lubricant consisting essentially of a major proportion di-octyl phenyl phosphonate and a smaller but sufficient proportion within the range of about 15 to 50 percent of hexachlorobutadiene to increase the fire resistance and extreme pressure properties of the phosphonate.

4. A fire-resistant functional fluid and lubricant consisting essentially of a major proportion di(n-amyl) phenyl phosphonate and a smaller but sufficient proportion within the range of about 15 to 50 percent of hexachloropropylene to increase the fire resistance and extreme pressure properties of the phosphonate.

5. A fire-resistant functional fluid and lubricant consisting essentially of a major proportion di(n-amyl) phenyl phosphonate and a smaller but sufficient proportion within the range of about 15 to 50 percent of hexachlorobutadiene to increase the fire resistance and extreme pressure properties of the phosphonate.

6. A fire-resistant functional fluid and lubricant consisting essentially of a major proportion di(n-butyl) phenyl phosphonate and a smaller but sufficient proportion within the range of about 15 to 50 percent of hexachloropropylene to increase the fire resistance and extreme pressure properties of the phosphonate.

7. A fire-resistant functional fluid and lubricant consisting essentially of a major proportion di(n-butyl) phenyl phosphonate and a smaller but sufficient proportion within the range of about 15 to 50 percent of hexachlorobutadiene to increase the fire resistance and extreme pressure properties of the phosphonate.

8. The composition consisting essentially of a major proportion of a phosphonate having three organic radicals of the group consisting of phenyl, cresyl, xylyl, alkyl with from 4 to 10 carbon atoms, and alkoxy alkyl with from 3 to 6 carbon atoms and a relatively minor but sufficient proportion within the range of about 15 to 50 percent of normally liquid halogenated hydrocarbon liquid at temperatures within the range of about −20° C. to 200° C. effective to increase the fire-resistance and extreme pressure properties of the ester, the resulting mixture of ester and halogenated hydrocarbon containing a sufficient proporiton of poly alkyl methacrylate to increase the viscosity index.

9. The composition consisting essentially of a mixture of a major proporation of phosphonate having three organic radicals of the group consisting of phenyl, cresyl, xylyl, alkyl with from 4 to 10 carbon atoms, and alkoxy alkyl with from 3 to 6 carbon atoms and from about 15 to 50 percent of normally liquid chlorinated hydrocarbon liquid at temperatures within the range of about −20° C. to 200° C. effective to increase the fire-resistance and extreme pressure properties of the ester, the resulting mixture of ester and chlorinated hydrocarbon containing a sufficient proportion of poly alkyl methacrylate to increase the viscosity index.

References Cited in the file of this patent

UNITED STATES PATENTS

| | | |
|---|---|---|
| 2,245,649 | Caprio | June 17, 1941 |
| 2,413,170 | Clark | Dec. 24, 1946 |
| 2,442,741 | Morgan | June 1, 1948 |
| 2,502,392 | Sconce | Mar. 28, 1950 |
| 2,509,620 | Watson et al. | May 30, 1950 |
| 2,528,348 | Denison et al. | Oct. 31, 1950 |
| 2,583,588 | Mosteller | Jan. 29, 1952 |
| 2,636,861 | Watson | Apr. 28, 1953 |
| 2,707,176 | Gamrath | Apr. 26, 1955 |

OTHER REFERENCES

"Lubrication Eng.," October 1949, pp. 231–235.
"Lubrication Eng.," December 1949, pp. 264–269.